A. B. SHARP.

Revolving-Rakes.

No. 137,247.

Patented March 25, 1873.

Witnesses:
G. Mathys.
Golonc Kennon

Inventor:
Absolam B. Sharp
Per [signature]
Attorneys.

UNITED STATES PATENT OFFICE.

ABSOLAN B. SHARP, LABADIEVILLE, LOUISIANA.

IMPROVEMENT IN REVOLVING RAKES.

Specification forming part of Letters Patent No. 137,247, dated March 25, 1873.

*To all whom it may concern:*

Be it known that I, ABSOLAN B. SHARP, of Labadieville, in the parish of Assumption and State of Louisiana, have invented a new and Improved Pea-Vine and Corn-Stalk Gatherer, of which the following is a specification:

This invention relates to a rake adapted especially for gathering pea-vines, corn-stalks, and other plants cultivated on ridges; and it consists in the provision of a revolving rake-head carrying a series of teeth of unequal lengths, which are so arranged in relation to each other that the teeth operate or rake both in the furrows and on the ridges, a hinged check-plate being provided or combined with the rake for holding the teeth stationary until a load is collected by the same, when, through the medium of a hand-lever and connecting-rods, the plate is disengaged from the teeth for allowing the same to revolve to discharge the load.

Figure 1:
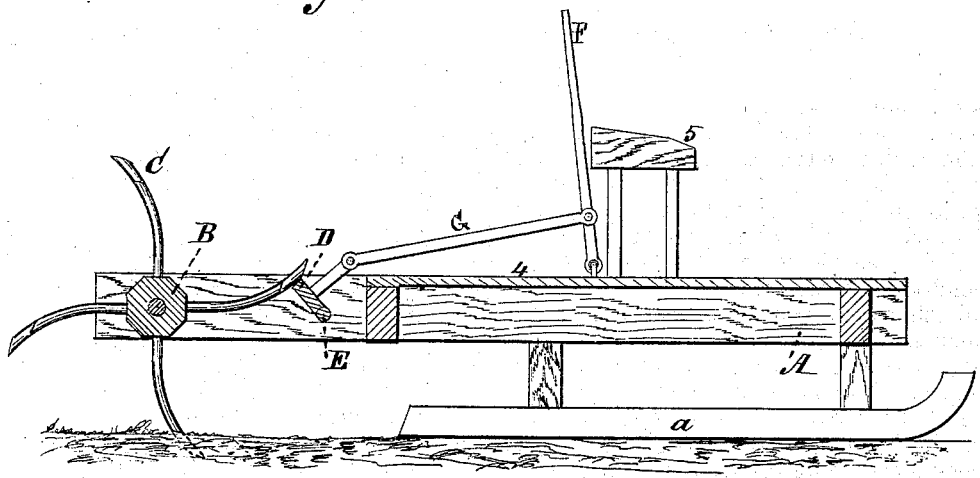
Figure 2:
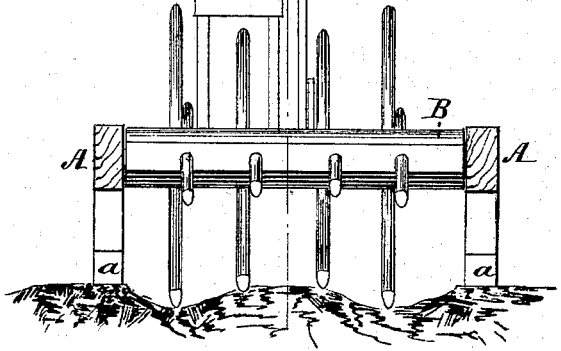

In the drawing, Figure 1 is a longitudinal section, and Fig. 2 is an end view, of my machine.

The frame A carrying the raking devices is generally of a rectangular form, mounted upon two lateral runners, *a a*, for obviating the necessity of constructing wheels, and the machine may, when desirable, be connected by means of flexible joint with a wheeled carriage-frame, in order to enable it to rise or fall according to the inequalities of the ground. B is an axle or transverse revolving shaft, which is provided with four longitudinal rows or lines of curved spikes or rake-teeth, C, that project at equal distances apart from the perimeter of the said axle. The teeth, in order to enable the same to conform to ridges and furrows upon which the pea-vines are generally planted, are made of unequal lengths—*i. e.*, with a central series of teeth, and adapted for running on the ridges, and a suitable number of outer teeth of increased length for running in the furrows—as clearly shown in Fig. 2. A rake provided with teeth of the form described will prevent the penetration of the teeth into the ground when used upon irregular surfaces of ground, such as ridges and furrows, and will permit the machine to be drawn lengthwise of the furrows across the field or in line with the furrows and ridges, thus obviating the jars or vibrations of the rake, and loss of time in operation if the rake were made to traverse across the ridges. The revolving axle carrying the rake-teeth is provided with end journal-pins or gudgeons, which are fitted in boxes in the side bars of the frame. A platform, 4, provided with a driver's seat, 5, is placed on, and a tongue or pole may be securely attached to, this frame for the direct application of the draft. At the edge of the platform 4 that is next the axle B a removable and adjustable board, D, is supported by two projecting tenons, E, forming pivots, which enter the side pieces of the frame. The board D acts as a stopper to prevent the revolution of the axle B with the rake-teeth around it, except at the pleasure of the driver, or automatically, when it is moved by the upward pressure, caused by an undue accumulation of pea-vines or corn-stalks, as the case may be, on any given row of the rake-teeth. In order to enable the driver to operate the board D, a lever, F, is pivoted at the front end of the frame 4, as shown, and connected to the said board by means of a link, G, or some equivalent contrivance.

The operation of my invention is as follows: The machine is drawn over the field or corn-ridges where the pea-vines are generally planted, and the teeth will in their progress separate or collect the vines from the corn-stalks, thus obviating the necessity of cutting either. When the machine is put in motion the extremities of one row of the rake-teeth will rest against the near edge of the board D, and thus prevent the axle from revolving, while the next lower row will occupy the best position for collecting the substance to be gathered as the machine moves forward. As soon as a sufficient quantity or mass of pea-vines or cornstalks is collected by the raking row of teeth, the driver, by pushing the lever F forward, withdraws the board D from under the teeth that have rested against it, and when this is done the weight of the collected mass at once rotates the axle and rake-teeth, and causes a deposition of the gathered mass by reversing the direction of the angle of the teeth on which it rested from a forward to a backward line, and in this way effecting a change of the relation of the said row of teeth to the said mass from an under or supporting position to one which not only allows but facilitates a deposit of said mass in a more or less concentrated or compact condition on the ground. To prevent too great a rotation of the teeth and axle the driver has only to draw back the lever F as soon as he has released any given row of teeth, or to let it go, to secure the resumption of its normal position by the board D, either by such backward movement of the lever F or the gravity of the said board. Having resumed its normal position the board D interposes an effectual bar to a greater rotation of the teeth than forty-five degrees because the next succeeding row must come into contact with it, as did the first, and stop a further revolution. There being four rows of teeth at equal distances apart, it follows that the rotation must always be in any one movement just forty-five degrees or one-quarter of a circle. The operation for every succeeding row of teeth is precisely the same as that just described, until the whole field has been traversed and the harvest is completed.

If, from inattention, the driver should at any time neglect to operate the lever F an automatic delivery or deposition will always take place at proper intervals, for the moment a sufficient accumulation of the substance being collected is raked up by any given row of teeth to bring the mass into contact with board D, the upward pressure thereof will lift this board and effect a deposit, so that it will be observed that under no circumstances nor conditions can the machine ever be stopped by clogging.

Having thus described my invention, what I claim as new, and desire to secure by Letters Patent, is—

A pea and bean vine rake consisting of the revolving rake B C, the teeth of unequal lengths to rake in the furrows and on the ridges, as described, frame A, pivoted-stop D E, lever F, and connecting rod or link G, as and for the purpose set forth.

ABSOLAN B. SHARP.

Witnesses:
G. C. THIBODAUX,
L. BOUDREAUX.